United States Patent [19]

Dwivedi et al.

[11] 4,254,155
[45] Mar. 3, 1981

[54] PREPARING NEOHESPERIDIN DIHYDROCHALCONE SWEETENER COMPOSITION

[75] Inventors: Basant K. Dwivedi, Randolph; Prathivadibhayankaram S. Sampathkumar, Parsippany, both of N.J.

[73] Assignee: Chimicasa GmbH, Chur, Switzerland

[21] Appl. No.: 34,565

[22] Filed: Apr. 30, 1979

Related U.S. Application Data

[63] Continuation-in-part of Ser. No. 969,391, Dec. 14, 1978.

[51] Int. Cl.³ ............................................... A23L 1/236
[52] U.S. Cl. ..................................... 426/548; 426/658
[58] Field of Search ............... 426/548, 658, 656, 657, 426/456

[56] References Cited

U.S. PATENT DOCUMENTS

| | | | |
|---|---|---|---|
| 3,087,821 | 4/1963 | Horowitz et al. | 426/548 |
| 3,296,079 | 1/1967 | Griffin | 426/548 X |
| 3,739,064 | 6/1973 | Rizzi | 426/548 X |
| 3,851,073 | 11/1974 | Cook | 426/548 X |
| 3,932,678 | 1/1976 | Rizzi | 426/548 |
| 4,001,453 | 1/1977 | Huber et al. | 426/548 X |
| 4,085,232 | 4/1978 | Eisenstadt | 426/548 |

FOREIGN PATENT DOCUMENTS

50-35349  4/1975  Japan ................................. 426/548

*Primary Examiner*—Joseph M. Golian
*Attorney, Agent, or Firm*—Richard P. Crowley

[57] ABSTRACT

A neohesperidin dihydrochalcone-based sweetener composition which comprises neohesperidin dihydrochalcone, a water-soluble carrier, and optionally a taste modifier, the composition having an acidic pH and characterized by being a water-soluble, nondiscoloring composition with reduced or devoid of undesirable lingering aftertaste properties.

9 Claims, No Drawings

PREPARING NEOHESPERIDIN DIHYDROCHALCONE SWEETENER COMPOSITION

REFERENCE TO PRIOR APPLICATION

This application is a continuation-in-part of U.S. patent application Ser. No. 969,391, filed Dec. 14, 1978, hereby incorporated by reference.

The prior application is directed to novel water-soluble tetrahydroxy-4'-methoxydihydrochalcone sweetener compositions prepared by dissolving about one part of water-insoluble 2,4,6,3'-tetrahydroxy-4'-methoxydihydrochalcone in from about 1 to 1000 parts by weight of a hydroxy-containing organic compound, and heating the solution at a temperature of from about 30° C. to 180° C. to provide a water-soluble artificial-sweetener composition. Typically the hydroxy-containing organic compound is selected from the group consisting of a polyhydric alcohol, water-soluble arabin-type gum and gelatin.

BACKGROUND OF THE INVENTION

Artificial-sweetener compositions have been employed for imparting sweeteners to food, beverage, confectionery and other products, and more particularly artificial-sweetener agents and compositions have been used by persons affected by physiological disorders, such as diabetes mellitus, and by those persons who must restrict their caloric intake as part of a weight-control regimen. Artificial-sweetener agents are useful not only in food and beverages, but also are useful in certain oral and cosmetic compositions.

Sweetening and flavoring characteristics have been imparted to various compositions by the use of various synthetic sweeteners. The most commonly used artificial sweeteners are the compounds of saccharin. A number of dihydrochalcone glycosides and dihydrochalcones has been known to impart a sweet taste, such as, for example, those compounds as set forth in U.S. Pat. Nos. 3,087,821; 3,583,984; 3,974,299; 3,976,790; 3,984,394; and 4,013,801. The dihydrochalcones appear to be nontoxic and potentially attractive as nonsugar-sweetener agents, especially because they are noncaloric, not having any insulin requirement. However, a number of dihydrochalcone glycosides has not proven to be satisfactory wholly, because of their limited solubility in water and a lingering aftertase.

Important factors to be considered in the selection and use of a chalcone sweetener or any sweetener are water solubility, nondiscoloration with time and aftertaste properties. Neohesperidin dihydrochalcone (NHDC) has very limited water solubility (3.6 g/liter at 20° C.: reference—California Aromatics and Flavors, Inc., Bulletin, page 111). In addition, an aqueous NHDC solution has been found to develop a yellow discoloration over a period of time which is or will be quite objectionable in sweetener compositions. A further deterrent to the adoption and use of NHDC is its aftertaste properties.

The dihydrochalcones, especially NHDC, display a somewhat slow onset of sweet taste, followed by a lingering menthol-like aftertaste. Thus, the use of NHDC as such probably will be restricted to certain confections and in pharmaceuticals in which the taste characteristics of NHDC are acceptable. In order to use NHDC as a food additive in various other food preparations, the lingering taste should be eliminated or reduced to a minimal acceptable level, so that NHDC sweetener compositions can be used together with a variety of food preparations, without any undesired effect on the normal taste of the food.

SUMMARY OF THE INVENTION

This invention relates to novel sweetener compositions containing neohesperidin dihydrochalcone (NHDC) and to the process of preparing such compositions and to the use of such compositions as artificial-sweetener agents in food, beverage and confectionery compositions. In particular, this invention concerns novel, NHDC sweetener compositions in which the NHDC exhibits significantly improved water solubility, which compositions are colorless and nondiscoloring with time. More particularly, this invention also is directed to NHDC compositions which are characterized by a reduction or an elimination of undesired aftertaste properties formerly associated with the use of NHDC.

Firstly, it has been found that NHDC compositions of enhanced water solubility can be prepared by combinations, admixtures or interactions of NHDC with an electron-donating compound, such as a hydroxy or an amino organic compound, to form a reversible-type physical adduct or otherwise to interact with the NHDC to form a water-soluble compound.

It has been discovered that the solubility of NHDC in water can be increased considerably by admixing NHDC with certain water-soluble carriers, such as hydroxy organic compounds, polyhydric alcohols, polysaccharides such as mono- and di-saccharides, malto dextrins or certain hydrocolloids such as gelatins, gums and cellulose derivatives. Although not wishing to be bound by any particular mechanism or theory, it is believed that, when NHDC and the water-soluble carrier are admixed in different proportions, physical adducts are formed with NHDC, with increased water solubility.

Suitable hydroxy compounds are represented by, but not limited to: water-soluble carbohydrates; sugar alcohols; amino acids; carboxylic acids; proteins and natural gums and their salts, alone or in combination. In the preferred embodiment, the sweetener compositions of this invention are prepared with polyols and saccharides, such as sorbitol, and with gelatin.

This invention relates also to the process of preparing the artificial-sweetener compositions, which process comprises the admixing together of the NHDC with the carrier compound. The admixture may take place in bulk or in the presence of a carrier liquid, such as water or an alcohol or water-and-alcohol solution of the compound. The NHDC sweetener is prepared simply by admixing with the dihydrochalcones with the carrier compound typically in proportions of from about 1:1 to 1:100; for example, 1:5 to 1:50, parts by weight. The admixture is heated to a temperature generally within the range of from about 30° C. to 180° C., but preferably 40° C. to 120° C., for a period of time until maximum solubility in water has been achieved by the admixture. Maximum solubility in water can be determined by taking and testing proportional aliquots of the admixture. Generally maximum solubility in water is obtained when the admixture has been heated within the above-described temperature ranges for periods of from about 5 to 60 minutes; for example, 15 to 40 minutes.

In addition, it has been discovered that the formation of yellow coloration in aqueous NHDC compositions (mixtures or complexes) can be inhibited and prevented, so that colorless solutions are obtained and maintained by the maintenance of the compositions at a pH of below 7.0, and particularly below 6.5; for example, 5.0 to 6.0. In particular, it has been found that the incorporation into the water-soluble NHDC compositions of a sufficient amount of a food-acidulant agent prevents discoloration of the compositions. The food acidulants suitable for use may include any inorganic or organic acid or acid-salt compound and may comprise, but not be limited to: acids, such as phosphoric, hydrochloric acetic, adipic, fumaric, lactic, malic, succinic, tannic, tartaric or citric acid, or combinations thereof, but particularly malic or citric acid or acid salts thereof, which, on addition to the aqueous composition, lower the pH to the desired level. The preferred acidulants are weak organic $C_1$-$C_6$ organic mono- or di-carboxylic acids. Typically, the amount of acidulant required ranges from about 0.1% to 15% by weight of the NHDC; for example, 2% to 12%. The acidulant may be added to the aqueous composition either before, during or after the addition of the water-carrier compound, but preferably is added after the formation of the water-soluble NHDC composition.

Also and optionally, the lingering aftertaste of the acidic water-soluble NHDC composition can be reduced, inhibited or prevented by the use of various taste-modifier agents added to the composition in an amount, and alone or in combination, to permit the undesirable aftertaste to be removed or reduced. The taste modifier may be used in amounts of from about 0.001% to 2% by weight of the composition; for example, 0.05% to 1% by weight, to mask the aftertaste properties, without substantially and adversely affecting the taste of any food or beverage to which the aqueous composition of the present invention is applied. The compounds used as taste modifiers may vary, but include those compounds which are nontoxic food additives which alter taste.

The preferred compositions of this invention include those acidic NHDC compositions containing a water-soluble carrier compound and a taste modifier. The NHDC sweetener compositions of this invention may be employed in bulk as a crude mixture or may be spearated employing drying and grinding into a powder or by other separating techniques, such as fractional crystallization and the like. These compositions then may be employed as artificial-sweetener agents by incorporating the mixture in desirable amounts in food, beverages, confectionerys, chocolate products and the like, alone or in combination with natural or artificial sweeteners and other additives. Typically from about 0.0001% to 10%; for example, 0.001% to 0.05%, by weight of the artificial-sweetener composition is employed as an additive-sweetener agent to edible products to effect sweetening; although the amount employed may vary as desired, based on the sweetening power desired.

It is often desirable to dissolve the NHDC in alcohol, in order to incorporate it into or with the polyhydric-alcohol or into or with a water/polyhydric-alcohol solution. The NHDC may be dissolved easily in alcohol, such as ethanol, prior to being incorporated into the polyhydric-alcohol or water/polyhydric-alcohol solution, with typically the NHDC being employed in amounts up to about 20% by weight in the alcohol or water solution.

The process includes dissolving the neohesperidin dihydrochalcone in an alcohol, such as ethanol, admixing the dihydrochalcone-alcohol solution with a hydroxy organic carrier compound, and heating to remove the alcohol. The process also involves dissolving the artificial sweetener composition in water, drying the solution under vacuum and recovering a powered, water-soluble, sweetener composition.

The polyhydric alcohols useful in the preparation of the water-soluble NHDC sweetener compositions are typically monomeric or polymeric alcohols having at least one functional hydroxyl group, but preferably two, three or more hydroxyl groups. The polyhydric alcohols employed may have from two to about one hundred carbon atoms in their molecular structure, but typically are monomeric or polymeric aliphatic polyhydric alcohols of from about three carbon atoms to thirty carbon atoms. Such polyhydric alcohols include, but are not limited to: propylene glycol, erythritol, pentaerythritol, sorbitol, mannitol, xylitol and polymeric polyols, such as the polyol glycerols represented by triglycerol, tetraglycerol, hexaglycerol, decaglycerol, pentaglycerol and the like, including isomeric forms and mixtures thereof. It has been found that the higher molecular-weight and higher OH-content polyols, such as sorbitol, are most preferred in that the aftertaste is avoided with such compounds. Such polyhydric alcohols typically have little sweetening power, per se, in comparison to sucrose.

Other useful compounds include materials such as water-soluble, arabin-type gums, such as arabic gum and the like, which contain complex carbohydrates and which on hydrolysis yield sugar, while gelatin has been found to provide very water-soluble NHDC sweetener compositions.

For the purpose of illustration only, the invention will be described in connection with certain embodiments and the process of making and using the invention, as well as the best mode contemplated by the inventors for carrying out the invention. However, it is recognized that persons skilled in the art may make various changes and modifications in the composition and process, without departing from the spirit and scope of the invention as described and claimed herein.

DESCRIPTION OF THE PREFERRED EMBODIMENTS

The following examples are given to illustrate the present invention:

EXAMPLE 1

Neohesperidin dihydrochalcone (10 g) and sorbitol (50 g) were mixed together and were heated to 140° C. to 170° C. (water or alcohol in appropriate quantities may be used to assist dissolution of the starting material). The liquified mixture was cooled to about 60° C. to 70° C., and the pH of the solution was adjusted to 5.5 to 6.0 by the addition of citric acid or malic acid. Then a mixture of disodium 5'—inosinate and disodium 5'—guanylate (0.016 g), which is commercially obtained as ribotide, was added and the entire mixture was dried by conventional methods. The dried mixture was ground into a fine powder. The resulting composition had excellent solubility in aqueous solution and gave an immediate sweet taste with no methanol-like aftertaste. This composition may be used to sweeten beverages and other food products.

EXAMPLE 2

A sweetening composition was prepared as in Example 1; however, using mannitol rather than sorbitol. The composition may be used in the same manner as in Example 1.

EXAMPLE 3

A sweetening composition was prepared as in Example 1, using malto-dextrin rather than sorbitol. The composition had the same qualities as the composition of Example 1.

Similarly, several other water-soluble carriers that can be used in the place of carbohydrates include polyhydric alcohols, such as glycerol, propyleneglycol, triglycerol, tetraglycerol, hexaglycerol and decaglycerol, and certain hydrocolloids, such as gum arabic, gelatin, pectin, carrageenan and sodium salt of carbomethoxy cellulose.

EXAMPLE 4

Several other taste modifiers were tested for the overall quality and the results are summarized in Table I. Aqueous solutions (1% w/v) of a variety of NHDC/water-soluble carrier compositions were used for testing the organoleptic properties.

TABLE I

| TASTE MODIFIER | TASTE OBSERVED |
| --- | --- |
| 1. Maltol | Noticeable lingering taste |
| 2. Ethyl maltol | Good sweetness - slight taste of ethyl maltol |
| 3. Monosodium glutamate | Sharp - meaty flavor |
| 4. Disodium 5' - inosinate + disodium 5' - guanylate | Excellent taste - no lingering taste |
| 5. Sodium acetate | Reduced lingering taste |
| 6. Sodium chloride | Slightly salty taste - reduced lingering taste |
| 7. Glycine | Excellent taste - lingering not noticeable |
| 8. Calcium sulfate, chloride or other calcium salts | Lingering is reduced - cloudiness appears in the solution |

Sodium chloride and monosodium glutamates, well known and accepted taste modifiers, are unacceptable as taste modifiers with the NHDC composition, while glycine and the sodium inosinateguanylate are most preferred.

EXAMPLE 5

A suitable reactor vessel was charged with 10 g of NHDC and 50 g of sorbitol and then 0.7 g of citric acid added, and the resulting solution was heated to 120° C. to 140° C. for 20 minutes and then cooled. The reaction product was dried and powdered by the usual method and was sieved into a 200-to-300-mesh sieve. 10 g of this mixture were easily soluble in 75 cc of water at 12° C. The aqueous solution was clear and colorless and had, based on the dry substance, 200 times the sweetening power of crystalline sugar and had minimal menthol taste. It is advantageously used for sweetening of foodstuffs and does not exhibit any damaging or unpleasant side effects.

Other water-soluble NHDC compositions are listed in Table II.

The acidulant-like malic or citric acid is incorporated to lower the pH to less than 6.5, in order to remove the yellow color formed in aqueous solutions of NHDC-based compositions.

TABLE II

| EXPERIMENT # | AMOUNT OF WATER-SOLUBLE CARRIER | Amount OF NHDC | TEMP. RANGE | DURATION (Minutes) | SOLUBILITY | TASTE IN AQUEOUS SOLUTION |
| --- | --- | --- | --- | --- | --- | --- |
| 1 | Glycerol-10g | 2g | 90–150° C. | 30 | Slowly goes into solution | Sweet with slight lingering aftertaste |
| 2 | Triglycerol-10g | 2g | 80–120° C. | 15–20 | Slowly goes into solution | Sweet with slight lingering aftertaste |
| 3 | Hexaglycerol-10g | 2g | 100–140° C. | 20 | Slowly goes into solution | Sweet with slight lingering aftertaste |
| 4a | Fructose-10g | 2g | 80–100° C. | 15 | Slowly goes into solution | Sweet with slight lingering aftertaste |
| 4b | Corn syrup-100g | 10g | 100–110° C. | 15 | Readily soluble | Sweet with slight lingering aftertaste |
| 5a | Mannitol-10g | 2g | 140–180° C. | 15 | Readily soluble | Sweet with very slight lingering aftertaste |
| 5b | Mannitol-50g | 1g | 140–180° C. | 15 | Readily soluble | Sweet with very slight lingering aftertaste |
| 6a | Sorbitol-50g | 10g | 120–140° C. | 15 | Readily soluble | Sweet with very slight lingering aftertaste |
| 6b | Sorbitol-100g | 1g | 120–140° C. | 15 | Readily soluble | Sweet with very slight lingering aftertaste |
| 7 | Malto Dextrin-100g | 10g | 140–160° C. | 30 | Readily soluble | Sweet with very slight lingering aftertaste |
| 8 | Gum Arabic-50g | 1g | 140–160° C. | 15 | Slowly goes into solution | Sweet with very slight lingering aftertaste |
| 9 | Sodium salt of carbomethoxy cellulose-50g | 10g | 140–160° C. | 15 | Slowly goes into solution | Sweet with slight lingering aftertaste |
| 10 | Gelatin-100g | 1g | 120–140° C. | 20 | Readily soluble | Sweet with slight lingering aftertaste |
| 11 | Pectin-50g | 1g | 120–140° C. | 15 | Slowly goes into solution | Sweet with slight lingering aftertaste |
| 12 | Carrageenan-50g | 10g | 110–120° C. | 15 | Slowly goes into solution | Sweet with slight lingering aftertaste |

Having thus described our invention, what we claim is:

1. A process of preparing a water-soluble, nondiscoloring, sweetener composition, which process comprises:
   (a) admixing from about one part by weight of neohesperidin dihydrochalcone with from about 1 to 100 parts by weight of a water-soluble, organic, polyhydroxy carrier compound and heating the admixture to a temperature of from about 30° C. to 180° C., to form a water-soluble, reaction compound; and
   (b) adding from about 0.1% to 15% by weight of the neohesperidin dihydrochalcone of a carboxylic-acid food acidulant, to reduce the pH of the composition to 6.5 or less and provide a nondiscoloring composition.

2. The process of claim 1 which includes adding from about 0.001% to 2% by weight of a taste-modifier compound to modify the aftertaste of the sweetener composition.

3. The process of claim 2 wherein the taste-modifier compound is selected from the group consisting of maltol, ethyl maltol, disodium 5'-inosinate and disodium 5'-guanylate, sodium acetate, glycine and calcium sulfate and calcium chloride or other calcium salts.

4. The process of claim 1 wherein the carrier compound is selected from the group consisting of $C_3$–$C_{30}$ aliphatic polyhydric alcohols.

5. The process of claim 1 wherein the carrier compound comprises a compound selected from the group consisting of corn syrup, mannitol, sorbitol, malto dextrin and gelatin.

6. The process of claim 1 wherein the carboxylic acid is selected from the group consisting of citric acid, malic acid and combinations thereof.

7. The process of claim 1 which includes:
   (a) dissolving the neohesperidin dihydrochalcone in an amount of from up to about 20% by weight in an alcohol, prior to admixing with the polyhydroxy carrier compound; and
   (b) heating the sweetener composition, after the adding of the carboxylic-acid acidulant, to remove the alcohol.

8. The process of claim 1 which includes:
   (a) dissolving the water-soluble, nondiscoloring, sweetener composition in water;
   (b) drying the solution under vacuum; and
   (c) recovering a powdered, water-soluble, nondiscoloring, sweetener composition.

9. A process of preparing a water-soluble, nondiscoloring, sweetener composition, which process comprises:
   (a) admixing from about one part by weight of neohesperidin dihydrochalcone with from about 1 to 100 parts by weight of a water-soluble, organic, polyhydroxy carrier compound selected from the group consisting of $C_3$–$C_{30}$ aliphatic polyhydric alcohols and compounds selected from the group consisting of gum arabic, gelatin, pectin, carrageenan and the sodium salt of carbomethoxy cellulose, and heating the admixture to a temperature of from about 30° C. to 180° C., to form a water-soluble, reaction compound;
   (b) adding from about 0.1% to 15% by weight of the neohesperidin dihydrochalcone of a carboxylic-acid food acidulant, to reduce the pH of the composition to 6.5 or less and provide a nondiscoloring composition; and
   (c) adding from about 0.001% to 2% by weight of a taste-modifier compound to modify the aftertaste of the sweetener composition.

* * * * *